March 15, 1960 E. BOULANGER 2,928,295
VARIABLE SPEED TRANSMISSION DEVICE
Filed April 3, 1956 7 Sheets-Sheet 1
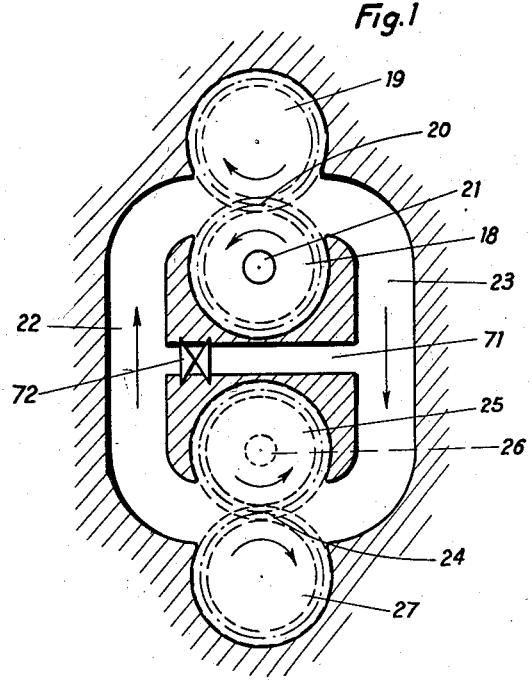
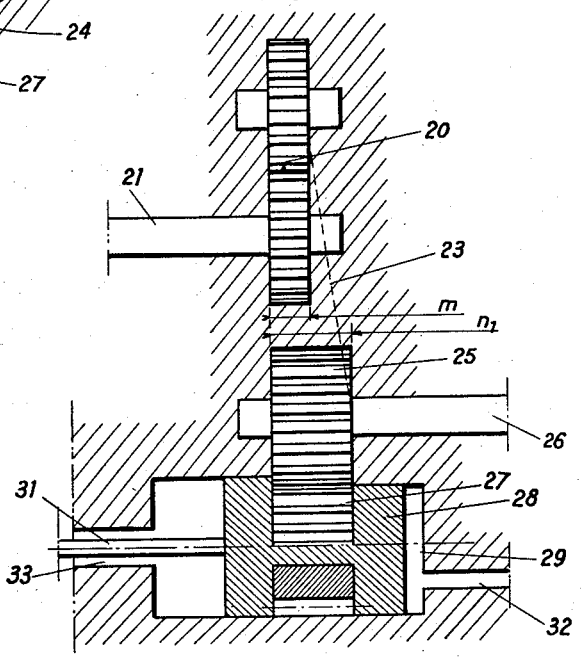
INVENTOR
ETIENNE BOULANGER
BY Young, Emery & Thompson
ATTYS.

March 15, 1960 E. BOULANGER 2,928,295
VARIABLE SPEED TRANSMISSION DEVICE
Filed April 3, 1956 7 Sheets-Sheet 2

INVENTOR
ETIENNE BOULANGER
BY Young, Emery & Thompson
ATTYS.

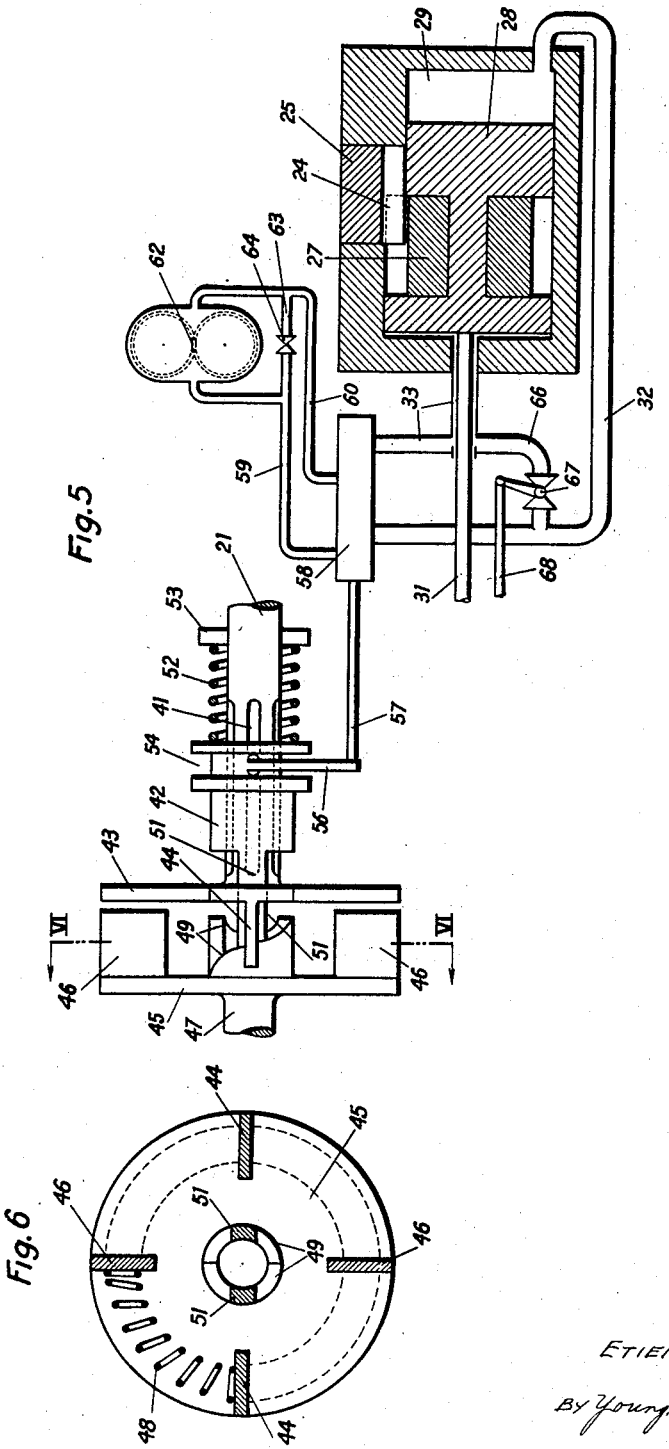

INVENTOR
ETIENNE BOULANGER
BY Irwin S. Thompson
ATTORNEY

March 15, 1960     E. BOULANGER     2,928,295
VARIABLE SPEED TRANSMISSION DEVICE
Filed April 3, 1956     7 Sheets-Sheet 6

INVENTOR
ETIENNE BOULANGER
By Young, Emery & Thompson
ATTYS.

March 15, 1960  E. BOULANGER  2,928,295
VARIABLE SPEED TRANSMISSION DEVICE
Filed April 3, 1956  7 Sheets-Sheet 7

INVENTORS
ETIENNE BOULANGER
By Young, Emery + Thompson
ATTYS.

United States Patent Office 2,928,295
Patented Mar. 15, 1960

2,928,295
VARIABLE SPEED TRANSMISSION DEVICE

Etienne Boulanger, Rouen, France

Application April 3, 1956, Serial No. 575,801

Claims priority, application France April 22, 1955

1 Claim. (Cl. 74—751)

The present invention concerns a device which ensures the transmission of a motive power with the possibility of varying, in a continuous manner the speed of rotation transmitted, practically without loss of power, so that the value of the torque varies in inverse proportion to the speed.

The device may be incorporated in an automatic control mechanism, interposed between a driving motor and a load, and so arranged that any variation in the resistance offered by the load acts on the device so as to produce a compensating variation in the transmission ratio. Such a property is particularly advantageous on a vehicle actuated by an internal combustion engine as such an engine only has a good efficiency between narrow speed limits.

The device according to the invention comprises essentially a pump actuated by the motor and a fluid motor connected with the load apparatus. Both the pump and the motor are placed in the closed circuit of a non compressible fluid and one of them, as least, is of the spur gear type, with one of the two pinions capable of being displaced axially so as to make it possible to vary the width of the portion of the teeth which is engaged.

It is convenient to add to the device a differential mechanism so as to be able to obtain a wider field of variation of the transmission ratio, including the ahead drive, the release and the rear drive.

The automatic control mechanism in which the transmission device may be incorporated comprises an elastic coupling located between the motor and the load, the deformations of which are used to operate a distributor interposed in the circuit of a non-compressible fluid crossing an auxiliary pump continuously rotating so as to control hydraulically the displacements of the movable pinion of the transmission device.

A manual and mechanical control mechanism for the movable pinion of the device may be added to this automatic control mechanism.

Particularly in the case of an application of the transmission device to an automobile vehicle, the automatic control device may comprise members for automatic clutching or releasing designed for opening or closing a connecting conduit between the suction and delivery conduits of the driving pump of the transmission device in accordance with certain values of the respective speeds of the motor and of the driving wheels of the vehicle.

Other novel features of the transmission device according to the invention will appear during the following description given by way of example with reference to the appended drawings, wherein:

Fig. 1 is a diagrammatic view of the variable speed transmission device.

Fig. 2 is a section perpendicular to Fig. 1.

Fig. 5 is a diagram of an automatic control mechanism for the device.

Fig. 6 is a section along the line VI—VI of Fig. 5.

Figure 3:
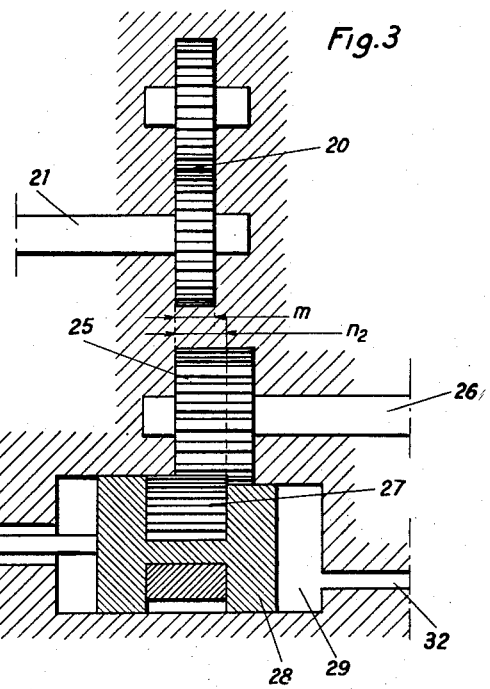
Fig. 3 is a section similar to Fig. 2 for a different position of the parts.

Fig. 1 shows, at 20, a gear pump comprising two spur pinions 18 and 19, the first one of which is secured on a shaft 21 coupled in a positive and permanent manner with the shaft, (not shown) of a driving motor. The pump 20 is inserted in the closed circuit of a non compressible fluid (such as oil) which comprises a suction conduit 22, a delivery conduit 23 and a spur gear motor 24 one pinion of which 25 carries a shaft 26 connected with a load (not shown).

As shown in Fig. 2, the other pinion 27 of the motor is held in a ram 28 capable of effecting axial movements in a cylindrical casing 29 and provided to that effect with a rod 31 which extends outside the casing 29. The displacements of the ram 28 may also be caused hydraulically by means of a fluid under pressure admitted through conduits such as 32 and 33 opening at the end of the cylindrical casing 29.

The operation of this elementary device is as follows:

Assuming that the four spur pinions constituting the pump 20 and motor 24 all have equal numbers of teeth of the same size, and calling $m$ the length of the teeth of the pinions of pump 20 and $n_1$ the length of the teeth of the pinions of the motor 24 it will be realized that if the elements are in the positions shown in Fig. 2, the transmission ratio of the device is equal to $$\frac{m}{n_1}$$

If the ram 28 is moved in such a manner that the length of the portion in engagement with the teeth of the pinions 25 and 27 is equal to $n_2$ as shown in Fig. 3, the transmission ratio of the device will increase and become equal to $$\frac{m}{n_2}$$

As a particular case, if the ram 28 is displaced so that the teeth of the pinions 25 and 27 in engagement be equal to $m$, the transmission ratio will obviously be equal to 1 and the shafts 21 and 26 will rotate at the same speed.

If the length of the pinions 25 and 27 in engagement is still decreased, the transmission ratio will become larger than 1 and the shaft 26 will rotate faster than the shaft 21.

Figure 4:
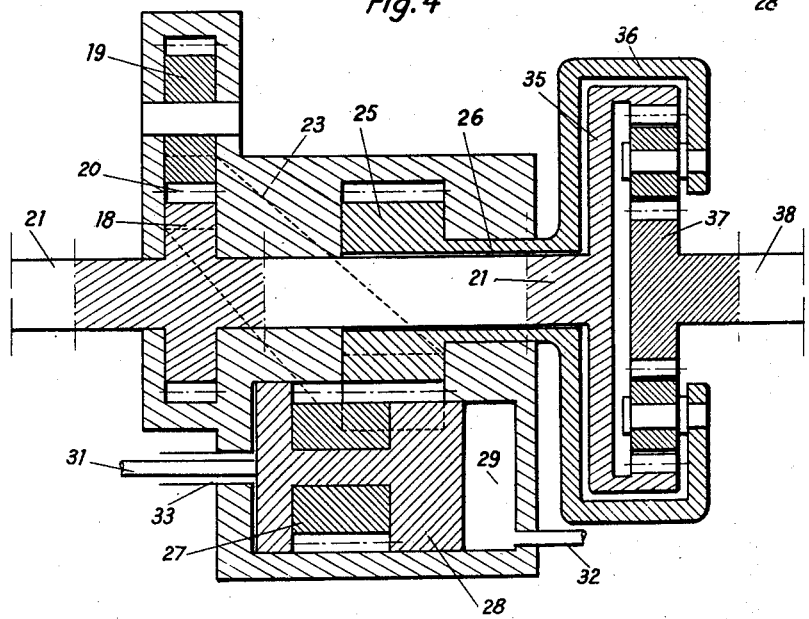
Fig. 4 shows, diagrammatically the combination of the device with a differential mechanism.

The efficiency of the device may be increased if this device is combined with an epicycloidal gear train or a differential mechanism as shown in Fig. 4, which shown with their reference numbers, the elements already described in Figs. 1 to 3; now, however, the driving shaft 21 passes coaxially inside the shaft 26 and bears at its end the planetary crown 35 of the differential mechanism, the intermediate wheel carrier 36 is secured on the tubular shaft 26 while its central pinion 37 drives a secondary shaft 38 connected with the load apparatus.

In order to understand more easily the operation of the transmission device thus arranged, a first hypothesis may be considered, according to which the secondary shaft 38 is not driven. This result is obtained when the ratio of the speeds of the shafts 21 and 26 (determined by the greater or smaller length of engagement of the pinions 25 and 27) is equal to the ratio of the speeds of the crown 35 and of the intermediate wheel carrier 36 in the case, assumed as a hypothesis, of a fixed central pinion 37. This corresponds to the release of the transmission device, As a second hypothesis, the case may be considered, already discussed above, where the length of engagement of the pinions 25 and 27 is equal to the length of the teeth of the pump 20; it was seen that the shafts 21 and 26 then rotate at the same speed and as it is the same thing for the crown 35 for the intermediate wheel carrier 36, the differential mechanism forms a block and the secondary shaft 38 rotates at the same speed as the shaft 21. This corresponds to the ahead drive for the transmission device.

Between these two extreme cases, it is possible to vary, in a continuous manner, the speed of the secondary shaft 38 by acting only on the ram 28, the shaft 21 keeping a constant or substantially constant speed.

By extension, by displacing the ram 28 to such an extent that the length of the pinions 25 and 27 in engagement becomes less than the length of the teeth of the pump 20, the secondary shaft 38 will rotate at a speed higher than that of the shaft 21, thus providing an "overmultiplication" of the speed.

The variable speed transmission device may be incorporated into an automatic mechanism designed to cause the necessary displacements of the ram 28 according to the variations of the resistance offered by the load apparatus, so as to transmit to the latter a constant power.

Figs. 5 and 6 show, diagrammatically, the main components of such a mechanism. In Fig. 5, the shaft 21 is shown again, which actuates the pump 20; the free end of this shaft carries a plate 43 provided with spurs 44 and forming one element of a resilient coupling, the other element of which is constituted by a similar plate 45 also provided with spurs 46 and attached at the end of a primary shaft 47 connected with the motor. As shown in Fig. 6, springs 48 are interposed between the spurs 44 and 46 in pairs, and through them the rotation torque is transmitted.

The plate 45 comprises, about its center, two helical ramps 49 against which two fingers 51 are applied, which go freely through the plate 43 and connect with a sleeve 42 mounted on the grooves 41 of the shaft 21. A strong spring 52 engaged between a flange 53 of the shaft 21 and the sleeve 42 acts so as to keep the flanges 51 in contact with the ramps 49.

The sleeve 42 comprises an annular groove 54 in which are engaged the ends of a fork 56 connected by a linkage system 57 with the movable slide valve of a four-way distributor 58 two ports of which are connected by the conduits 32 and 33 opening in the body 29, on both sides of the above described slide block 28.

The two other conduits 59 and 60 connected to the distributor 58 are respectively the suction conduits and delivery conduits of an auxiliary pump 62 driven continuously by the motor and ensuring a suitable flow of a non compressible liquid; a by-pass 63 comprising a loaded valve 64 makes it possible for the pump to operate uninterruptedly even when the circulation is interrupted through the conduits 59 and 60.

The operation of this automatic mechanism is as follows: So long as the resistant torque due to the load apparatus corresponds to the torque generated by the motor rotating at its optimum speed, the components remain in equilibrium in a position which is, for instance, that of Fig. 5.

If, for any reason whatsoever, the resisting torque increases, the springs 48 are compressed and the plate 45 turns by a certain angle with respect to the plate 43. Thus the helical ramps 49, which carry out the same relative motion with respect to the fingers 51 push these back as the sleeve 42 in spite of the action of the spring 52. The sliding motion of the sleeve 42 is transmitted through the fork 56 and the linkage 57 to the slide valve of the distributor 58 which then places in communication, on the one hand the delivery conduit 60 and the conduit 33 and on the other hand the conduit 32 and the suction conduit 59 of the auxiliary pump 62. The result is that the slide block 28 is displaced and increases the length of engagement of the pinions 25 and 27, so that the speed transmitted to the load apparatus decreases. The resistant torque referred to the shaft 21 decreases in the same proportion and again reaches the initial value. The springs 48 are slackened and the plates 43 and 45 as well as the sleeve 42 and the slide valve of the distributor 58 resume their positions of equilibrium, at which all communication is cut between the conduits 32 and 33 and the auxiliary pump 62; the latter feeding in a closed circuit on the bypass 63.

Things remain in that condition until a new variation occurs of the resistance offered by the load apparatus. Should this resistance happen to decrease, the elements of the mechanism act in opposed direction to the above, so that the speed of the load apparatus takes a greater value, and so on.

The complete automaticity of the transmission is thus obtained.

One of the most interesting uses of the automatic mechanism according to the invention consists in its application to a motor-vehicle with an internal combustion engine, the load apparatus then consists of the driving wheels of the vehicle and one knows how the uneven portions in the contour of the road to be covered make it necessary, frequently, to adapt the speed to the resistant torque in order to safeguard the efficiency of the engine and to limit its wear. This is what is best accomplished by the device according to the invention.

The requirements of the driving of the vehicle, however, make it necessary to superpose a manual control on the automatic mechanism, so as to obtain certain operating conditions which are, in particular, the rear drive, the release, the braking by means of the engine, etc.

To that effect, the control rod 31 is available, associated with the ram 28 and extending outside of the body 29; in addition, there is connected, between the conduits 32 and 33 a communication conduit 66 controlled by an obturator 67, itself operated through a rod 68.

For ensuring the rear drive, it is sufficient for the driver of the vehicle to act by means of a lever, on the one hand on the rod 68 so as to place the two conduits 32 and 33 in communication and on the other hand on the rod 31 so as to push back the slide block towards the right, until a position is reached similar to that of Fig. 2; the length of engagement of the teeth of the pinions 25 and 27 is such that the dead center described above is passed and by the action of the differential mechanism, the direction of rotation of the central pinion 37 and of the secondary shaft 38 is reversed, with respect to the direction of rotation of the shafts 47, 21 and 26.

In order to allow the release it is sufficient to arrange, between the conduits 22 and 23 which connect the pumps 20 and 24 a communication conduit 71 (Fig. 1) controlled by a valve 72, connected by a linkage system (not shown) with an operating lever which may be the same, as that ensuring the rear drive. It is obvious that when this valve is open the fluid motor 24 is no longer supplied and no transmission of motion takes place.

Figure 7:
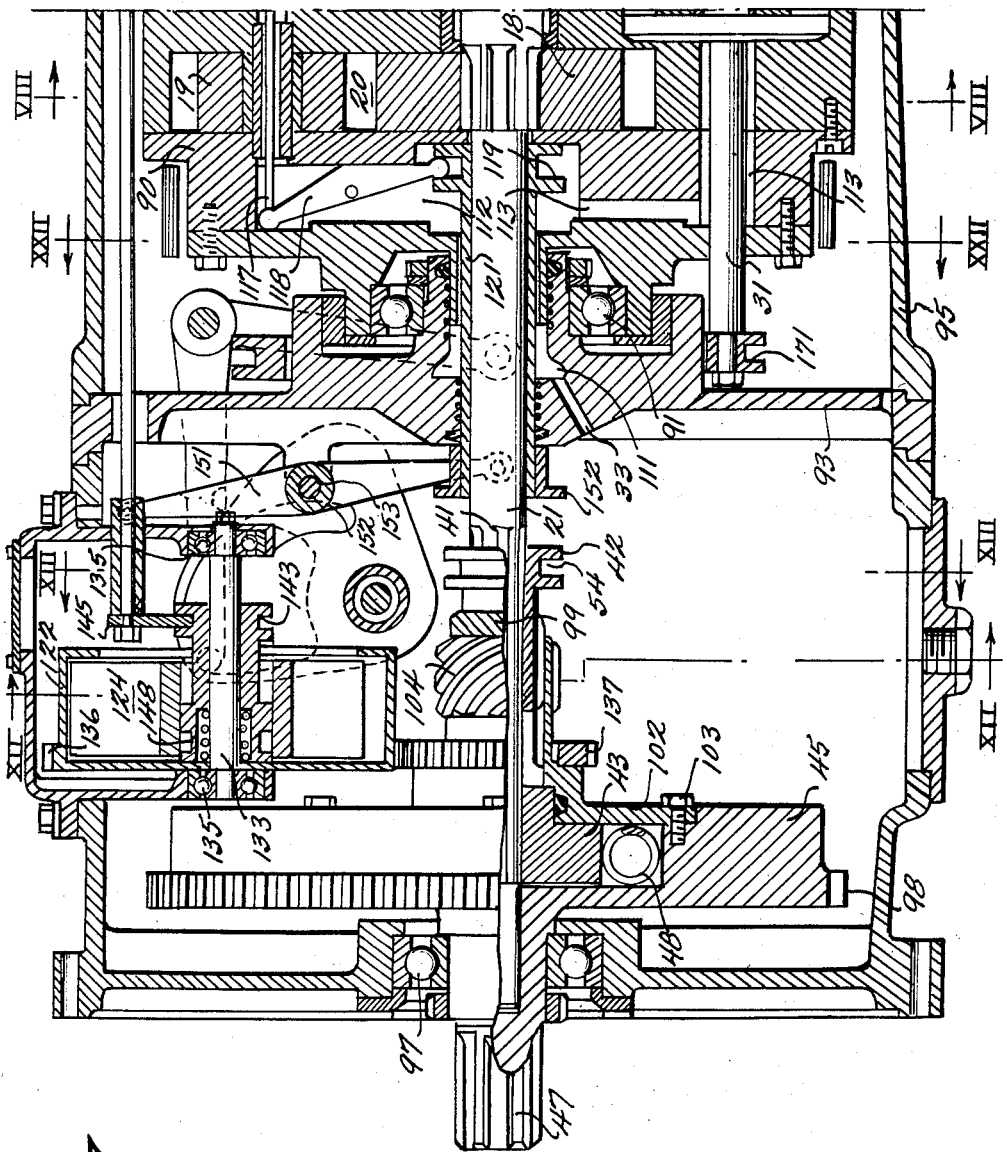
Figs. 7 and 7a are longitudinal sections of a complete automatic variable speed transmission mechanism.
Figure 7A:
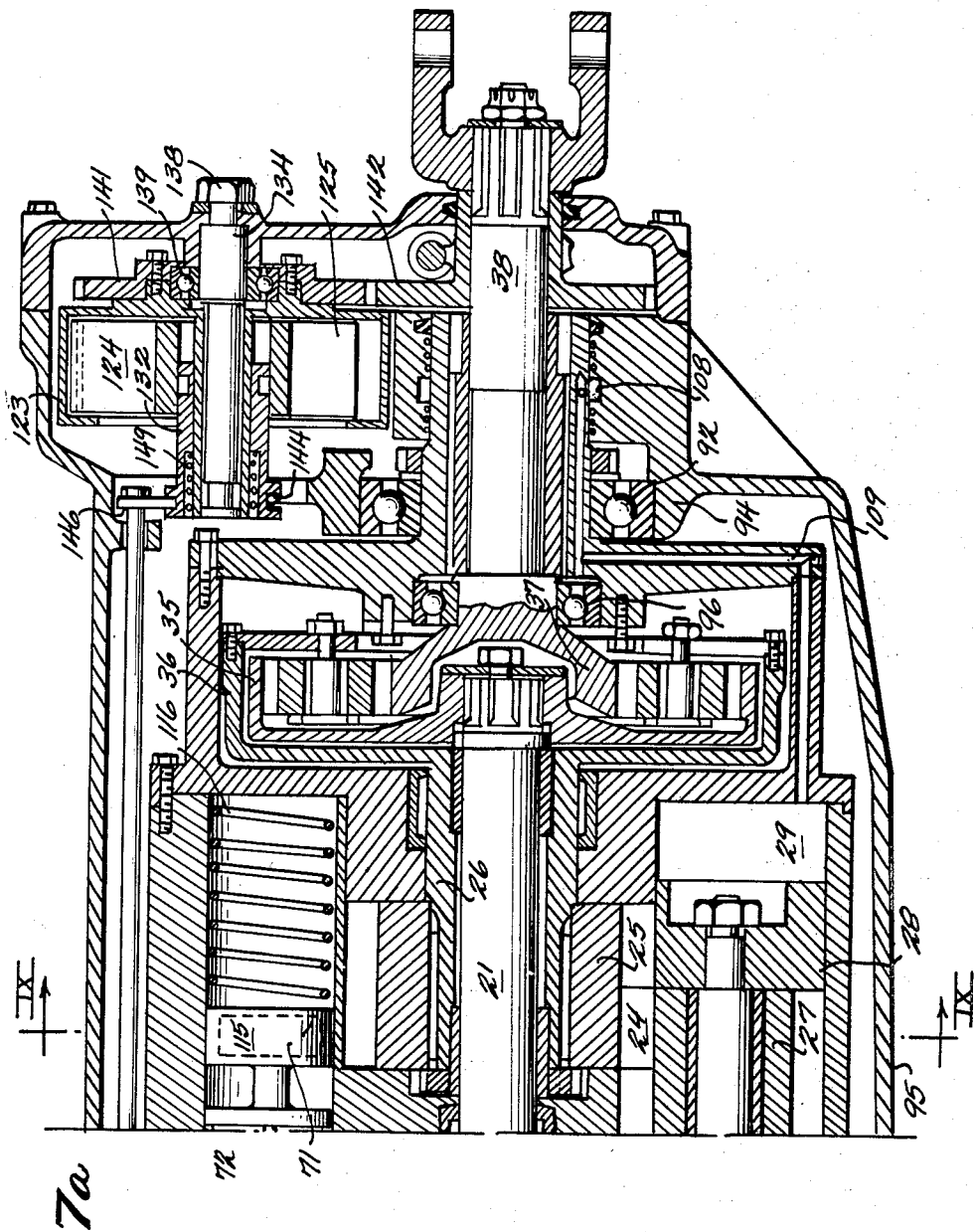

Fig. 7 and the following figures show more completely an embodiment of the variable speed transmission device and of the automatic mechanism, according to the invention, which were represented diagrammatically in Figs. 1 to 6. To facilitate the general understanding, the corresponding elements of the two sets of figures have been designated by the same reference numerals.

Figure 8:
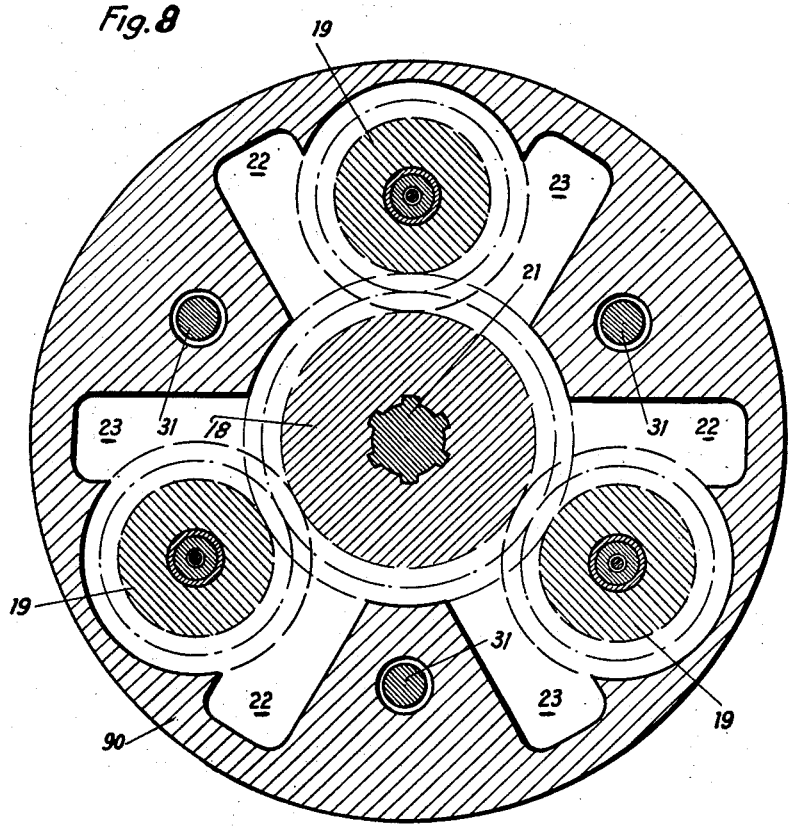
Fig. 8 is a section along the line VIII—VIII of Fig. 7.
Figure 9:
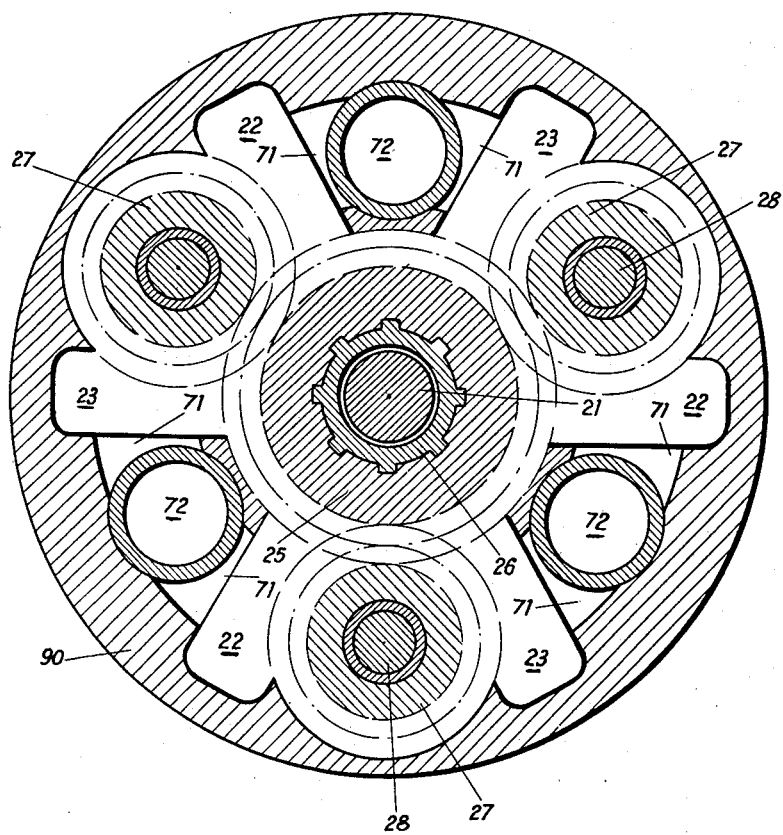
Fig. 9 is a section along the line IX—IX of Fig. 7.

Figs. 7 and 8 show the gear pinion 18 of the driving pump 20; this pinion, keyed on the shaft 21 is now engaged no longer with one pinion only but with three pinions 19 located 120° from one another, so as to correctly balance the assembly. Of course, on both sides of these three pinions, are three conduits 22 and three conduits 23 going to the fluid motor 24 which, for the same reason, comprises three sliding pinions 27 regularly spaced about a single pinion 25 keyed on the hollow shaft 24 (Fig. 9).

This pump and motor are housed in the same block 90 which is supported by two ball bearings 91 and 92 in the flanges 93 and 94 of a box 95 containing all the elements of the mechanism.

There is found again, in the region on the right of Fig. 7, the crown 35 and the intermediate wheel carrier 36, associated respectively with the shafts 21 and 26, as well as the central pinion 37 associated with the secondary shaft 38 of the mechanism supported by a ball bearing 96.

As it was shown previously in Fig. 5, the other end of shaft 21 carries a plate 43 (Fig. 7) connected by means of springs 48 with a plate 45 attached at one end of the primary shaft 47 of the mechanism; this primary shaft is supported by a ball bearing 97 carried by the box 95.

The plate 45 is of a massive construction, so as to play the part of a flywheel, it comprises, at its periphery a set of teeth 98 which engages the pinion of a starter of the usual type (not shown).

On the grooves 41 of the shaft 21, a sliding sleeve 42 is also engaged, which now carries, outwardly a helical set of teeth 99 in engagement with a corresponding set of teeth tapped into a bumper 102 secured by screws 103 to the plate 45. The two sets of teeth play the same part as the ramps 49 and the above described fingers 44; in addition, as their mutual engagement is permanent, the spring 52 shown in Fig. 5 is now omitted.

The bumper 102 comprises, exteriorly a helical pinion 104 which is in engagement with a pinion (not shown) which drives directly the auxiliary pump 62, the function of which has been set forth above.

With reference to Fig. 7, the conduit 32, which is not shown, reaches an annular chamber 108, provided in the flange 94 of the box 95. In the chamber 108 three conduits open, such as 109, bored in the trunnion of the body 90 of the pump 20 and motor 24; these conduits also connect, respectively the three above described cylindrical bodies 29.

The conduit 33 connects, as shown in Fig. 7, an annular chamber 111 provided in the flange 93 and communicating with another chamber 112 of the pump body 90 in which three conduits originate, such as 113, leading respectively to the three cylindrical bodies 29.

The assembly of elements just described operates exactly in the conditions set forth with reference to Fig. 5 and ensure a transmission the ratio of which varies automatically according to the power required.

For ensuring a complete automaticity in the use of the mechanism according to the invention, on a vehicle, it is necessary to provide a clutch which also operates automatically in such a manner, for instance, as to unclutch as soon as the speed of the motor falls below a certain limit, which eliminates all risks of the engine stalling. Similarly, it is very useful that the clutching be effected automatically as soon as the engine rotates at a speed above the limit just indicated or again as soon as the wheels of the vehicle rotate at a speed higher than a predetermined value; this latter condition is very useful as it makes it possible to ensure the braking by the engine even if the latter was formerly stopped and it also makes it possible to let the car run down a slope to cause the starting of the engine.

It was seen, in connection with Fig. 1, that for unclutching the transmission device, it was sufficient to open the valve 73 controlling the communication conduit 71 between the suction and delivery conduits 22 and 23 of the driving pump 20.

According to Figs. 7 and 9, to each one of the three movable pinions 27 of the fluid motor 24 there corresponds a particular communication conduit 71 and consequently the mechanism comprises three valves 72, identical to one another and located 120° from one another. The valve 72 which is visible in section in Fig. 7 contains a movable element 115 of the slide valve type, which, on one side is pushed back towards the position of closing by a spring 116 and, on the other side, comprises a rod 117 going through the axis of the corresponding pinion 19 and articulated on a rocker 118 engaged on the other hand in the annular groove 119 of a sleeve 121 sliding on the shaft 21 and common to the three valves 72.

It is clear that the operation, either automatic or manual, of the sliding sleeve 121 causes, at will, the clutching in or out of the mechanism. Since the automatic control should depend on the speed, either of the engine (primary shaft 47) or of the wheels of the vehicle (secondary shaft 38), an individual device having a centrifugal action is placed in relationship with each one of these shafts.

These two centrifugal devices are identical and each of them consists, as shown in Fig. 7 of a cylindrical drum 122 or 123, inside which are pivoted two slugs 124 and 125 offering, each one of them, about the center of the drum, a spur engaged in a helical groove of a slidable block 131 or 132 passed over the axle 133 or 134 of the drum.

As regards the drum 122, the axle 133 is supported by two ball bearings such as 135, carried by the box 95 of the mechanism. This drum 122 comprises a peripheral set of teeth 136 constantly engaged with a corresponding set of teeth 137 (Fig. 7) of the bumper 102 associated with the flywheel-plate 45.

The drum 123, the axle 134 of which is secured to the box 95 by a nut 138 is supported on that axle by a ball bearing 139 and comprises, laterally, a pinion 141 in permanent engagement with a pinion 142 keyed on the secondary shaft 38 of the transmission mechanism.

Each one of the slidable blocks 131, 132 comprises an annular groove 143 or 144 in which is engaged a fork 145 or 146 (Fig. 7) and these two forks are connected through a rod 147. The two slidable blocks 131 and 132 are thus positively connected to each other, and they are constantly urged towards the right of Fig. 7 by a spring 149 housed in the slidable block 132.

One end of a lever 151 pivoting about a fixed shaft 153 and the other end of which acts on a collar 152 of the sliding sleeve 121 is pivoted with the connecting rod 147.

As soon as the speed of rotation of one or the other of the drums 122 and 123 exceeds a predetermined value, the slugs 124 and 125 move apart and cause a sliding of the corresponding slidable block 131 or 132 in spite of the combined action of the springs 148 and 149. The connecting rod 141 moves towards the left in Fig. 7, the sleeve 121 slides towards the right and reaches the position shown in Fig. 7 in which the slide valves 115 of the three valves 72 close the communication conduits 71; that is the clutched-in position.

If the speed of rotation of one or the other of the drums 122 and 123 falls below a predetermined value, the slidable blocks 131 and 132, urged by their springs 148 and 149 move in an opposite direction to the above and by the action of the same elements the slide valves 115 uncover the communication conduits 71 which causes the unclutching. The desired conditions of automaticity are thus perfectly fulfilled by the mechanism according to the invention.

It should be noted that in the case of an ahead drive, the reactions of the pump 20 and motor 24 on the block 90 are equal and opposed in signs; this block, thus having a resulting reaction which is zero needs no lateral support on the box. If it is allowed to rotate freely in its bearings 91 and 92, the pinions of the pump 20 and motor 24 will have a zero relative motion, so that no wear of the parts will take place. For other speed ranges the block 90 should be stopped with respect to the box 95 and, to that effect a free wheel ratchet device will be interposed between this block 90 and the box 95. Such a ratchet device will allow the rotation in the ahead drive case and for the other cases, rear drive and braking by the engine, the band brake 178 will act as explained above, for temporarily stopping the block 90.

Many other detail arrangements may be added to the automatic transmission mechanism, without departing from the general spirit of the invention; thus, in particular, there may be added to the mechanism a supply tank for compensating the losses of non compressible fluid in the auxiliary pump 62.

I claim:

A variable speed transmission device comprising in combination a fixed frame, a driving shaft supported by said frame, a driven shaft supported by said frame and coaxial with the driving shaft, a casing rotatably mounted on said driving shaft and driven shaft, so as to permit a direct drive, a differential mechanism housed in said casing and comprising a ring gear attached to said driving shaft, a sun gear attached to said driven shaft, and a planet carrier responsive to variations in a variable transmission ratio hydraulic system, said hydraulic system comprising a body rotatably fitted in said casing, a hydraulic pump and a hydraulic motor both housed within said body, said pump being driven by said driving shaft and said motor being fed by said pump and attached to said planet carrier, means operatively connected to the hydraulic system to vary the transmission ratio of said hydraulic system in accordance with the couple exerted on the driving shaft, and means permitting rotation of the casing only in the direction of rotation of the driving shaft, the latter means comprising a free wheel device between said body and said casing.

References Cited in the file of this patent
UNITED STATES PATENTS

| | | |
|---|---|---|
| 2,517,188 | Feng | Aug. 10, 1950 |
| 2,666,293 | Vigneau | Jan. 19, 1954 |